(12) United States Patent
Norton

(10) Patent No.: US 11,656,168 B2
(45) Date of Patent: May 23, 2023

(54) METHODS AND SYSTEMS FOR DETERMINING A DROP DELAY OF A FLOW STREAM IN A FLOW CYTOMETER

(71) Applicant: BECTON, DICKINSON AND COMPANY, Franklin Lakes, NJ (US)

(72) Inventor: Pierce O. Norton, Los Gatos, CA (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 472 days.

(21) Appl. No.: 16/911,325

(22) Filed: Jun. 24, 2020

(65) Prior Publication Data
US 2020/0326271 A1    Oct. 15, 2020

Related U.S. Application Data

(62) Division of application No. 15/623,074, filed on Jun. 14, 2017, now Pat. No. 10,732,094.
(Continued)

(51) Int. Cl.
*G01N 15/14* (2006.01)
*G06T 7/246* (2017.01)
(Continued)

(52) U.S. Cl.
CPC ..... *G01N 15/1459* (2013.01); *G01N 15/1404* (2013.01); *G01N 15/1425* (2013.01);
(Continued)

(58) Field of Classification Search
None
See application file for complete search history.

(56) References Cited

U.S. PATENT DOCUMENTS 5,643,796 A    7/1997   Van Den Engh et al.
6,372,506 B1   4/2002   Norton
(Continued)

FOREIGN PATENT DOCUMENTS

JP    2011507470 A    7/2011
WO   WO2013185023    12/2013
(Continued)

OTHER PUBLICATIONS

Search Report issued for Singapore application No. 11201808302V, dated Jun. 12, 2020, p. 2 pages.
Verwer, Ben "BD FACSDiVa Option," White Paper, 2002, 22 pages.

*Primary Examiner* — Brian R Gordon
(74) *Attorney, Agent, or Firm* — Bret E. Field; Bozicevic, Field & Francis LLP

(57) ABSTRACT

Methods and systems for determining a drop delay of a flow stream in a flow cytometer are provided. Aspects of the methods according to certain embodiments include capturing an image of the flow stream to obtain an imaged flow stream, identifying a disturbance at a break off point in the imaged flow stream and calculating the drop delay of the flow stream based on the identified disturbance. Systems for practicing the subject methods having an imaging sensor for capturing one or more images of the flow stream and a processor configured to identify a disturbance at a break off in the imaged flow stream and calculating the drop delay using the imaged flow stream are also provided. Non-transitory computer readable storage mediums are also described.

23 Claims, 1 Drawing Sheet

Related U.S. Application Data

(60) Provisional application No. 62/403,553, filed on Oct. 3, 2016.

(51) Int. Cl.
   *G01N 15/00* (2006.01)
   *G01N 15/10* (2006.01)

(52) U.S. Cl.
   CPC ......... *G01N 15/1429* (2013.01); *G06T 7/246* (2017.01); *G01N 2015/0065* (2013.01); *G01N 2015/1006* (2013.01); *G01N 2015/1406* (2013.01); *G01N 2015/149* (2013.01)

(56) References Cited

U.S. PATENT DOCUMENTS

| | | | |
|---|---|---|---|
| 8,922,646 B2 | 12/2014 | Neckels et al. | |
| 9,952,076 B2* | 4/2018 | Norton | G05D 7/0617 |
| 10,302,545 B2* | 5/2019 | Crow | G01N 15/1404 |
| 10,466,158 B2* | 11/2019 | Otsuka | G01N 15/1425 |
| 10,578,469 B2* | 3/2020 | Norton | G01F 1/661 |
| 10,871,790 B2* | 12/2020 | Sharpe | G01N 15/1425 |
| 11,060,894 B2* | 7/2021 | Norton | G05D 7/0617 |
| 2011/0045993 A1* | 2/2011 | Kent | B01L 3/502776 |
| | | | 382/128 |
| 2014/0309782 A1 | 10/2014 | Sharpe et al. | |
| 2015/0068957 A1 | 3/2015 | Otsuka et al. | |
| 2018/0284007 A1* | 10/2018 | Crow | G01N 15/1459 |
| 2018/0292304 A1* | 10/2018 | Otsuka | G01N 15/1436 |
| 2018/0356846 A1* | 12/2018 | Sharpe | G01N 15/1484 |

FOREIGN PATENT DOCUMENTS

| | | |
|---|---|---|
| WO | WO2014169231 | 10/2014 |
| WO | 2017062319 A1 | 4/2017 |

\* cited by examiner

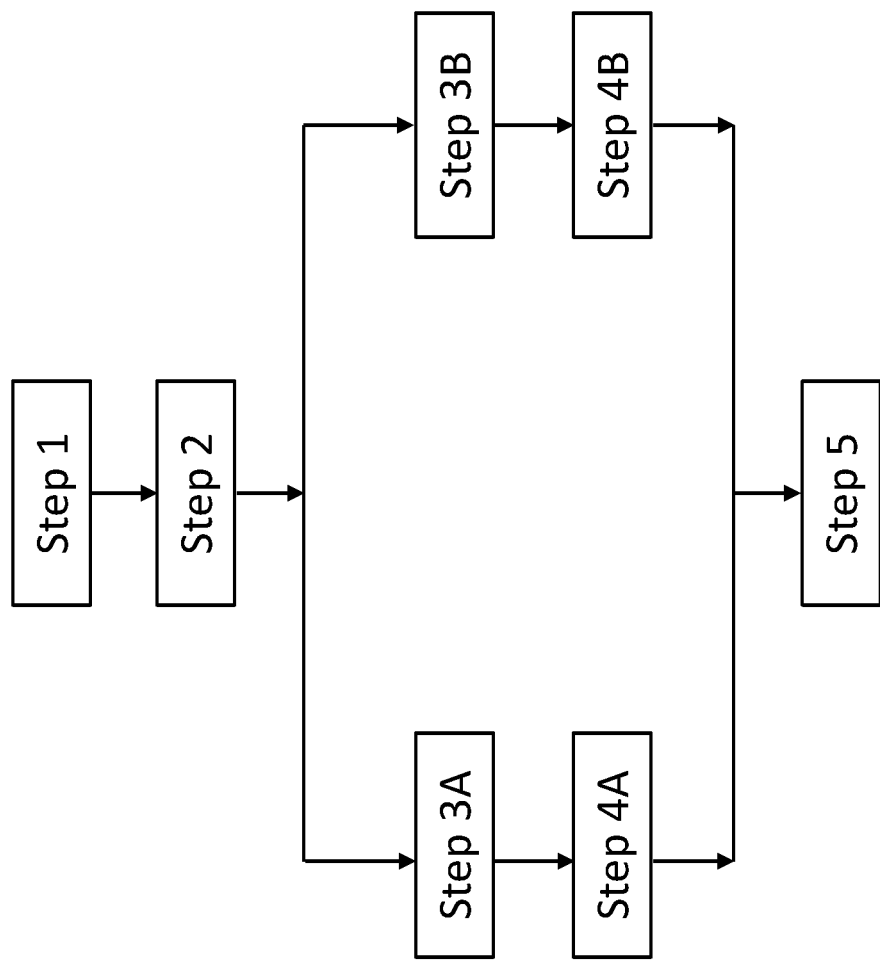

METHODS AND SYSTEMS FOR DETERMINING A DROP DELAY OF A FLOW STREAM IN A FLOW CYTOMETER

CROSS-REFERENCE TO RELATED APPLICATION

This application is a divisional of U.S. patent application Ser. No. 15/623,074, filed Jun. 14, 2017, now U.S. Pat. No. 10,732,094, which claims priority to U.S. Patent Application Ser. No. 62/403,553, filed Oct. 3, 2016; the disclosure of which applications are incorporated herein by reference.

INTRODUCTION

Flow cytometers are used for analyzing and sorting particles in a fluid sample, such as cells of a blood sample or particles of interest in any other type of biological or chemical sample. Within a flow cell, a liquid sheath is formed around the particle-containing stream to impart a substantially uniform velocity on the flow stream. The flow stream exits the flow cell via a nozzle with a nozzle diameter that is appropriate for the fluidics system and sort rate desired. The flow cell hydrodynamically focuses the particles (e.g., cells) within the stream to pass through the center of an irradiation source (e.g. laser beam). The intersection at which the particles of interest in the flow stream pass through the irradiation source is often referred to as the interrogation point. As particles of interest (e.g., cells) move through the interrogation point, light from the irradiation source (e.g., laser) is scattered. The light can also excite components in the cell stream that have fluorescent properties, such as fluorescent markers that have been added to the fluid sample and adhered to certain cells of interest.

In flow cytometers that sort cells by an electrostatic method, the desired cells are contained within an electrically charged droplet. To charge the droplet, the flow cell includes a charging element. Since the cell stream exits the flow cell in a substantially downward vertical direction, the droplets also propagate in that direction after they are formed. When a target particle is detected by an interrogating laser, a charge is applied to the droplet that contains the target particle. The drop delay value is the distance in time between the laser interrogation point where a target particle is detected and the point where the droplet breaks off from the continuous flow stream. Above the break-off point, the flow stream is continuous and connected; below it, the flow stream is disjunct as discrete droplets. Generally, the drop delay is the amount of time (in drop equivalents) that a cell sorter will wait before applying a charge to the droplet after detecting the target particle with the interrogating laser. Variability in the size of particles present in the flow stream or drift in the flow cytometer components can impact the predictability of whether a drop in the flow stream contains a particle of interest. Inaccurate predictions of droplets that contain particles (e.g., applying a charge to the wrong droplet) can be detrimental to qualitative analysis, resulting in imprecise cell sorting, contamination of sorted samples as well as quantitative loss of biological sample.

SUMMARY

Aspects of the present disclosure include methods for determining a drop delay of a flow stream in a flow cytometer. Methods according to certain embodiments include capturing an image of the flow stream to obtain an imaged flow stream, identifying a disturbance at a break off point in the imaged flow stream and calculating a drop delay of the flow stream based on the identified disturbance. In some embodiments, the disturbance is the fanning of the flow stream at the break off point. In other embodiments, the disturbance is a deflection of the flow stream at the break off point. In embodiments, methods include capturing one or more images of the flow stream in a detection field and identifying a disturbance in the flow stream in the detection field. In some embodiments, the detection field includes the flow stream upstream from the flow stream break-off point and downstream from the laser irradiation point.

Methods also include, according to some embodiments, determining the drop delay that produces the maximal amplitude of the identified disturbance. The drop delay of the flow cytometer may be set across a range of drop delays and the disturbance at the break off point is visualized at each drop delay to identify the drop delay that produces the maximal amplitude of the identified disturbance. In some embodiments, the disturbance is fanning of the flow stream at the break off point and the methods include setting the flow cytometer across a range of drop delays and identifying the drop delay which produces the greatest amount of fanning of the flow stream at the break off point. In other embodiments, the disturbance is a deflection (i.e., deviation in the trajectory) of the flow stream and the methods include setting the flow cytometer across a range of drop delays and identifying the drop delay which produces the greatest amount of deflection from the longitudinal axis of the flow stream. To determine the drop delay that produces the maximal amplitude of the identified disturbance, a phase mask may be also applied, such as a phase mask having $\frac{1}{32}$ drop equivalent increments.

Calculating a drop delay according to certain embodiments of the present disclosure includes determining the drop delay that produces the maximal amplitude of the identified disturbance and adding a predetermined drop equivalent to the determined drop delay that produces the maximal amplitude of the identified disturbance. The resultant drop delay will be the optimized drop delay for the particular stream conditions. For example, the drop equivalent may range from a $\frac{1}{32}$ drop equivalent to 1 drop equivalent, such as a $\frac{1}{2}$ drop equivalent. In certain instances, no drop equivalent is added to the drop delay that produces the maximal amplitude of the identified disturbance. In some embodiments the predetermined drop equivalent is half a drop. In other embodiments, calculating a drop delay of the flow stream includes determining the drop delay that produces the maximal amplitude of the identified disturbance while applying a predetermined offset. For example, a drop delay may be calculated by applying a one-half drop equivalent offset and then determining the drop delay that produces the maximal amplitude of the identified disturbance.

In certain embodiments, the subject methods reduce the need for user input or manual adjustment during setup of a flow cytometer or between analyses of different samples. In some embodiments, methods of interest may partially or fully automate a flow cytometer so that parameters, such as calculation of drop delay, of the flow cytometer are processor controlled. In certain embodiments, the methods include determining drop delay of the flow cytometer without any human input. For example, methods may include determining drop delay of the flow stream in the absence of calibration particles (e.g., fluorescent beads). Parameters of the flow cytometer may be adjusted in response to the determined drop delay, such as changing the timing of applying an electrical charge of the flow stream, adjusting the duration of the electrical charging pulse, the voltage of the electrical charge or changing the flow rate of the flow stream.

Aspects of the present disclosure also include systems for determining drop delay of a flow stream in a flow cytometer. Systems according to certain embodiments include an imaging sensor configured to capture one or more images of a flow stream and a processor having memory operably coupled to the processor where the memory includes instructions to identify a disturbance at a break off point in the imaged flow stream and to calculate a drop delay of the flow stream based on the identified disturbance. For example, the memory may include instructions to identify fanning of the flow stream at the break off point or a deflection of the flow stream at the break off point. In embodiments, the subject systems are configured to capture one or more images of the flow stream in a detection field and identify a disturbance in the flow stream in the detection field. In some instances, the detection field includes the flow stream upstream from the flow stream break-off point and downstream from the laser irradiation point.

Aspects of the present disclosure also include a non-transitory computer readable storage medium for determining a drop delay of a flow stream in a flow cytometer. Non-transitory computer readable storage mediums according to certain embodiments include instructions stored thereon having algorithm for capturing an image of a flow stream with an image sensor, algorithm for identifying a disturbance at a break off point in the imaged flow stream and algorithm for calculating drop delay of the flow stream based on the identified disturbance. The non-transitory computer readable storage medium may also include algorithm for determining the drop delay that produces the maximal amplitude of the identified disturbance. In these embodiments, the computer readable storage medium includes algorithm for setting the flow cytometer across a range of drop delays and algorithm for determining the drop delay that produces that maximal amplitude of the identified disturbance. For example, the computer readable storage medium may include algorithm that determines the drop delay that produces the greatest amount of fanning of the flow stream at the break off point or algorithm that determines the drop delay that produces the greatest amount of deflection from the longitudinal axis of the flow stream.

BRIEF DESCRIPTION OF THE FIGURES

The invention may be best understood from the following detailed description when read in conjunction with the accompanying drawing. Included in the drawing is the following FIGURE:

FIG. 1 depicts a flow diagram for determining a drop delay of a flow stream in a flow cytometer according to certain embodiments.

DETAILED DESCRIPTION

Aspects of the present disclosure include methods and systems for determining a drop delay of a flow stream in a flow cytometer. Methods according to certain embodiments include capturing an image of the flow stream to obtain an imaged flow stream, identifying a disturbance at a break off point in the imaged flow stream and calculating a drop delay of the flow stream based on the identified disturbance. Systems for practicing the subject methods having an imaging sensor for capturing one or more images of the flow stream and a processor configured to identify a disturbance at a break off in the imaged flow stream and calculating a drop delay using the imaged flow stream are also provided. Non-transitory computer readable storage mediums are also described.

Before the present invention is described in greater detail, it is to be understood that this invention is not limited to particular embodiments described, as such may vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

As summarized above, the present disclosure provides methods for determining drop delay of a flow stream in a flow cytometer. In further describing embodiments of the disclosure, methods for determining drop delay based on an identified disturbance in the flow stream at the break off point are first described in greater detail. Next systems having an imaging sensor for capturing one or more images of the flow stream and a processor configured to calculate a drop delay using one or more of the captured images are described. Non-transitory computer readable storage mediums are also provided.

Methods for Determining a Drop Delay of a Flow Stream in a Flow Cytometer

As summarized above, aspects of the present disclosure include methods for determining a drop delay of a flow stream in a flow cytometer. Methods according to certain embodiments include capturing an image of the flow stream to obtain an imaged flow stream, identifying a disturbance at a break off point in the imaged flow stream and calculating a drop delay of the flow stream based on the identified disturbance. In embodiments, the subject methods may be fully automated, such as to reduce or entirely eliminate the need for user input or manual determination of drop delay of the flow stream. In certain embodiments, the subject methods eliminate the use of fluorescent particles (e.g., beads) for determining drop delay of a flow cytometer system, such as during setup of the flow cytometer or in between analysis of different samples. In other words, determining the drop delay in certain embodiments may require little to no human intervention or manual input by the user. As discussed in greater detail below, methods may also include adjusting one or more parameters of the flow cytometer using the determined drop delay without any human intervention. For example, the timing of applying an electrical charge to the flow stream, the pulse duration when applying the electrical charge or the flow rate of the flow stream may be adjusted using the determined drop delay.

In practicing methods according to certain embodiments, one or more images of a flow cytometer flow stream are captured, such as in a detection field. By "detection field" is meant the region of the flow stream which is imaged by one or more imaging sensors. In embodiments, methods may include capturing in an image a detection field that spans 0.001 cm or more of the flow stream, such as 0.005 cm or more, such as 0.01 cm or more, such as 0.05 cm or more, such as 0.1 cm or more, such as 0.5 cm or more, such as 1 cm or more, such as 2 cm or more, such as 5 cm or more and including 10 cm or more of the flow stream. The detection field imaged may vary. In embodiments, the detection field is a predetermined length of the flow stream. In some embodiments, the detection field includes the flow stream upstream from the flow stream break-off point and downstream from a sample interrogation point (e.g., laser interrogation point). As described in greater detail below, a disturbance in the flow stream is identified in the imaged flow stream, such as fanning or deflection of the flow stream at the break off point. In some examples, the boundaries of the detection field include the flow cell nozzle orifice.

In capturing one or more images of the flow stream, a detection field is illuminated with a light source. In some embodiments, the flow stream is illuminated with a broadband light source or with a narrow band of light. Suitable broadband light source protocols may include, but are not limited to a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof. Suitable narrow band light sources, include but are not limited to a narrow wavelength LED, laser diode or a broadband light source coupled to one or more optical bandpass filters, diffraction gratings, monochromators or any combination thereof. In certain embodiments, one or more images of the flow stream are captured by illuminating the detection field with an array of infra-red LEDs.

In certain embodiments, the light source is a stroboscopic light source where the flow stream is illuminated with periodic flashes of light. For example, the frequency of light strobe may be 0.01 kHz or greater, such as 0.05 kHz or greater, such as 0.1 kHz or greater, such as 0.5 kHz or greater, such as 1 kHz or greater, such as 2.5 kHz or greater, such as 5 kHz or greater, such as 10 kHz or greater, such as 25 kHz or greater, such as 50 kHz or greater and including 100 kHz or greater. In some instances, the strobe frequency is synchronized with droplet drive frequency. In other instances, the strobe frequency is synchronized with image capture.

Capturing one or more images of the flow stream may include illuminating the flow stream with a combination of light sources, such as with two or more light sources, such as three or more light sources, such as four or more light sources and including five or more light sources. Where more than one light source is employed, the flow stream may be illuminated with the light sources simultaneously or sequentially, or a combination thereof. For example, where images of the flow stream are captured by illuminating with two light sources, the subject methods may include simultaneously illuminating the flow stream with both light sources. In other embodiments, capturing images of the flow stream may include sequentially illuminating with two light sources. Where two light sources are illuminated sequentially, the time each light source illuminates the flow stream may independently be 0.001 seconds or more, such as 0.01 seconds or more, such as 0.1 seconds or more, such as 1 second or more, such as 5 seconds or more, such as 10 seconds or more, such as 30 seconds or more and including 60 seconds or more. In embodiments where images of the flow stream are captured by sequentially illuminating with two or more light sources, the duration the flow stream is illuminated by each light source may be the same or different.

Images of the flow stream may be captured continuously or in discrete intervals. In some instances, methods include capturing images continuously. In other instances, methods include capturing images in discrete intervals, such as capturing an image of the flow stream every 0.001 millsecond, every 0.01 millsecond, every 0.1 millsecond, every 1 millsecond, every 10 millseconds, every 100 millseconds and including every 1000 millseconds, or some other interval.

One or more images may be captured in the detection field, such as 2 or more images of the flow stream in each detection field, such as 3 or more images, such as 4 or more images, such as 5 or more images, such as 10 or more images, such as 15 or more images and including 25 or more images. As described in greater detail below, methods include determining the drop delay that produces the maximal amplitude of the identified disturbance by sweeping across a range of different drop delays and determining the amplitude of the disturbance at each drop delay. In these embodiments, one or more images are captured at each of the different drop delay settings.

Images of the flow stream in each detection field may be captured at any suitable distance from the flow stream so long as a usable image of the flow stream is captured. For example, images in each detection field may be captured at 0.01 mm or more from the flow stream, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more from the flow cytometer flow stream. Images of the flow stream in each detection field may also be captured at any angle from the flow stream. For example, images in each detection field may captured at an angle with respect to the axis of the flow stream which ranges from 10° to 90°, such as from 15° to 85°, such as from 20° to 80°, such as from 25° to 75° and including from 30° to 60°. In certain embodiments, images in each detection field may be captured at a 90° angle with respect to the axis of the flow stream.

In some embodiments, the methods include setting the flow cytometer at a plurality of different drop delays and capturing one or more images of the flow stream at each of the different drop delays. In some instances, one or more images of the flow stream are captured while varying the drop delay of the flow cytometer in increments of $1/128$ drop equivalents or more, such as $1/64$ drop equivalents or more, such as $1/32$ drop equivalents or more, such as $1/16$ drop equivalents or more, such as $1/8$ drop equivalents or more, such as $1/4$ drop equivalents or more, such as $1/2$ drop equivalents or more, such as 1 drop equivalent or more, such as 2 drop equivalents or more, such as 3 drop equivalents or more, such as 4 drop equivalents or more and including capturing one or more images of the flow stream while varying the drop delay of the flow cytometer increments of 5 drop equivalents or more.

In one example, methods include capturing one or more images of the flow stream while varying the drop delay of the flow cytometer in increments of $1/32$ drop equivalents. In another example, the methods include capturing one or more images of the flow stream while varying the drop delay of the flow cytometer in increments of $1/4$ drop equivalents. In yet another example, methods include capturing one or more images of the flow stream while varying the drop delay of the flow cytometer in increments of $1/2$ drop equivalents. In still another example, the methods include capturing one or more images of the flow stream while varying the drop delay of the flow cytometer in increments of 1 drop equivalent. In still another example, the methods include capturing one or more images of the flow stream while varying the drop delay of the flow cytometer in increments of 2 drop equivalents.

In certain embodiments, the methods include changing the drop delay of the flow cytometer continuously and monitoring the flow stream in real time. The drop delay of the flow cytometer may be changed at any suitable rate, such as changing the drop delay by $1/128$ drop equivalents or more per minute, such as $1/64$ drop equivalents or more per minute, such as $1/32$ drop equivalents or more per minute, such as $1/16$ drop equivalents or more per minute, such as $1/8$ drop equivalents or more per minute, such as $1/4$ drop equivalents or more per minute, such as $1/2$ drop equivalents or more per minute, such as 1 drop equivalent or more per minute, such as 2 drop equivalents or more per minute, such as 3 drop equivalents or more per minute, such as 5 drop equivalents or more per minute and including 10 drop equivalents or more per minute.

As summarized above, the methods include identifying a disturbance at a break off point in the imaged flow stream. The term "break off point" is used herein in its conventional sense to refer to the location of the flow stream where the flow stream is disjunct as discrete droplets. In other words, upstream from the break off point, the flow stream is a continuous and connected fluidic stream and downstream from the break off point, the flow stream is composed of a plurality of droplets having no physical contact with each other. By "disturbance" in the flow stream at the break off point is meant an undesired change in one or more characteristics of the flow stream. For example, the disturbance of the flow stream at the break off point may result from the presence of target particles in the flow stream droplets. In some embodiments, the disturbance is a change in the flow rate of the flow stream at the break off point. In other embodiments, the disturbance is an undesired deflection (i.e., deviation in the angle of the trajectory) of the flow stream. In certain embodiments, the disturbance is a fanning of the flow stream at the break off point. The term "fanning" is used herein in its conventional sense to refer to an undesired deviation in the trajectory of a plurality of droplets emanating from the flow stream at the break off point. In other words, fanning of the flow stream at the break off point results in droplets deflecting at one or more undesired angles with respect to the longitudinal axis of the flow stream.

The disturbance in the flow stream at the break off point may be identified using any convenient protocol. In some embodiments, the disturbance in the flow stream is identified by visualizing that the flow stream is fanning at the break off point in the imaged flow stream. For example, methods may include visualizing that droplets of the flow stream at the break off point are deflecting at two or more undesired angles with respect to the longitudinal axis of the flow stream, such as 3 or more undesired angles, such as 4 or more undesired angles, such as 5 or more undesired angles and including 10 or more undesired angles. In these embodiments, the trajectory of the plurality of droplets may deviate by 5° or more, such as 10° or more, such as 15° or more, such as 20° or more, such as 25° or more, such as 30° or more, such as 35° or more, such as 40° or more, such as 45° or more, such as 60° or more, such as 75° or more and including 85° or more. For instance, the trajectory of the plurality of droplets may deviate by 5° to 90°, such as from 10° to 85°, such as from 15° to 80°, such as from 20° to 75°, such as from 25° to 70°, such as from 30° to 65°, such as from 35° to 60° and including from 40° to 55°.

In other embodiments, the disturbance in the flow stream is identified by visualizing that the flow stream is being deflected at an undesired angle at the break off point in the imaged flow stream. In some instances, the flow stream is deflected by 5° or more, such as 10° or more, such as 15° or more, such as 20° or more, such as 25° or more, such as 30° or more, such as 35° or more, such as 40° or more, such as 45° or more, such as 60° or more, such as 75° or more and including 85° or more. For instance, methods may include identifying a disturbance in the flow stream by visualizing that the flow stream is being deflected at the break off point at an angle that ranges from 5° to 90°, such as from 10° to 85°, such as from 15° to 80°, such as from 20° to 75°, such as from 25° to 70°, such as from 30° to 65°, such as from 35° to 60° and including from 40° to 55°.

In embodiments of the present disclosure, a drop delay of the flow stream is calculated based on the identified disturbance. In certain embodiments, a drop delay is calculated by determining the drop delay of the flow cytometer that produces the maximal amplitude of the disturbance at the break off point and adding a predetermined drop equivalent to the drop delay that produces the maximal amplitude of disturbance. Determining from the captured images when the flow stream exhibits the maximal amplitude of the disturbance at the break off point may be achieved manually, such as by a user viewing each captured image or may be computer controlled where a processor having algorithm for assessing each of the captured images is configured to determine a maximal amplitude of the disturbance (e.g., maximal fanning of the flow stream or maximal stream deflection). To determine the drop delay of the flow cytometer that produces the maximal amplitude of the disturbance at the break off point, the flow cytometer may be varied across a plurality of different drop delays and one or more images of the disturbance at the break off point of the flow stream may be captured at each of the different drop delays. For example, one or more images of the disturbance at the break off point may be captured while varying the drop delay of the flow cytometer by increments of $1/32$ drop equivalents or more, such as $1/16$ drop equivalents or more, such as $1/8$ drop equivalents or more, such as $1/4$ drop equivalents or more, such as $1/2$ drop equivalents or more, such as 1 drop equivalent or more, such as 2 drop equivalents or more, such as 3 drop equivalents or more, such as 4 drop equivalents or more and including capturing one or more images of the flow stream while varying the drop delay of the flow cytometer by increments of 5 drop equivalents or more.

In one example, methods include capturing one or more images of the disturbance at the break off point of the flow stream while varying the drop delay of the flow cytometer by increments of $1/128$ drop equivalents. In another example, methods include capturing one or more images of the disturbance at the break off point of the flow stream while varying the drop delay of the flow cytometer by increments of $1/64$ drop equivalents. In another example, methods include capturing one or more images of the disturbance at the break off point of the flow stream while varying the drop delay of the flow cytometer by increments of $1/32$ drop equivalents. In another example, methods include capturing one or more images of the disturbance at the break off point of the flow stream while varying the drop delay of the flow cytometer by increments of $1/16$ drop equivalents. In another example, methods include capturing one or more images of the disturbance at the break off point of the flow stream while varying the drop delay of the flow cytometer by increments of $1/8$ drop equivalents. In another example, methods include capturing one or more images of the disturbance at the break off point of the flow stream while varying the drop delay of the flow cytometer by increments of $1/4$ drop equivalents. In yet another example, methods include capturing one or more images of the disturbance at the break off point of the flow stream while varying the drop delay of the flow cytometer by increments of $1/2$ drop equivalents. In still another example, methods include capturing one or more images of the disturbance at the break off point of the flow stream while varying the drop delay of the flow cytometer by increments of 1 drop equivalent. In still another example, methods include capturing one or more images of the disturbance at the break off point of the flow stream while varying the drop delay of the flow cytometer by increments of 2 drop equivalents. In certain embodiments, methods include changing the drop delay of the flow cytometer continuously and monitoring the disturbance at the break off point of the flow stream in real time, such as with the unaided eye or with a real time camera. In these embodiments, while monitoring the disturbance at the break off point of the flow stream, the drop delay of the flow cytometer may be varied by $1/128$ drop equivalents or more per minute, such as by $1/64$ drop equivalents or more per minute, such as by $1/32$ drop equivalents or more per minute, such as by $1/16$ drop equivalents or more per minute, such as by $1/8$ drop equivalents or more per minute, such as by $1/4$ drop equivalents or more per minute, such as by $1/2$ drop equivalents or more per minute, such as by 1 drop equivalent or more per minute, such as by 2 drop equivalents or more per minute, such as by 3 drop equivalents or more per minute, such as by 5 drop equivalents or more per minute and including by 10 drop equivalents or more per minute.

Calculating a drop delay of the flow stream according to certain embodiments of the present disclosure includes adding a predetermined drop equivalent to the determined drop delay that produces the maximal amplitude of disturbance at the break off point of the flow stream. For example, the methods may include adding a $1/32$ drop equivalent or more, such as a $2/32$ drop equivalent or more, such as a $3/32$ drop equivalent or more, such as a $4/32$ drop equivalent or more, such as a $5/32$ drop equivalent or more, such as a $6/32$ drop equivalent or more, such as a $7/32$ drop equivalent or more, such as a $8/32$ drop equivalent or more, such as a $10/32$ drop equivalent or more, such as a $12/32$ drop equivalent or more, such as a $14/32$ drop equivalent or more and including a $16/32$ drop equivalent (i.e., one-half drop equivalent) or more. In some instances, calculating a drop delay of the flow stream includes adding a drop equivalent that ranges from 0.01 drop to 5 drops to the determined drop delay that produces the maximal amplitude of disturbance at the break off point of the flow stream, such as a drop equivalent that ranges from 0.05 drops to 4.5 drops, such as from 0.1 drops to 4 drops, such as from 0.5 drops to 3.5 drops and including from 1 drop to 3 drops.

In some embodiments, determining the drop delay of the flow cytometer that produces the maximal amplitude of the disturbance at the break off point includes applying a phase mask. The term "phase mask" is used herein in it conventional sense to refer to a type of cell sorting mask employed by a flow cytometer which provides for the sorting of droplets in a flow stream that have no target particles at or near the edges of the droplet. The phase mask may be any convenient size, such as $1/128$ drop equivalent or more, such as $1/64$ drop equivalent or more, such as $1/32$ drop equivalent or more, such as $2/32$ drop equivalents or more, such as $3/32$ drop equivalents or more, such as $4/32$ drop equivalents or more, such as $5/32$ drop equivalents or more, such as $6/32$ drop equivalents or more, such as $7/32$ drop equivalents or more and including a phase mask of $8/32$ drop equivalents or more.

In certain instances, calculating a drop delay of the flow stream includes determining the drop delay of the flow cytometer that produces the maximal amplitude of the disturbance at the break off point of the flow stream while applying an offset phase mask and adding a predetermined drop equivalent to the drop delay that produces the maximal amplitude of the disturbance at the break off point of the flow stream. In these embodiments, the offset phase mask may be $1/128$ drop equivalent or more, such as $1/64$ drop equivalent or more, such as $1/32$ drop equivalent or more, such as $2/32$ drop equivalents or more, such as $3/32$ drop equivalents or more, such as $4/32$ drop equivalents or more, such as $5/32$ drop equivalents or more, such as $6/32$ drop equivalents or more, such as $7/32$ drop equivalents or more, such as $8/32$ drop equivalents or more, such as $10/32$ drop equivalents or more, such as $12/32$ drop equivalents or more, such as $14/32$ drop equivalents or more and including $16/32$ drop equivalents (i.e., one-half drop equivalent) or more.

Depending on the size of the offset phase mask, the predetermined drop equivalent added to the drop delay that produces the maximal amplitude of the disturbance at the break off point of the flow stream varies. For example, the methods may include adding a $1/128$ drop equivalent or more, such as a $1/64$ drop equivalent or more, such as a $1/32$ drop equivalent or more, such as a $2/32$ drop equivalent or more, such as a $3/32$ drop equivalent or more, such as a $4/32$ drop equivalent or more, such as a $5/32$ drop equivalent or more, such as a 6/32 drop equivalent or more, such as a 7/32 drop equivalent or more, such as a 8/32 drop equivalent or more, such as a 10/32 drop equivalent or more, such as a 12/32 drop equivalent or more, such as a 14/32 drop equivalent or more and including a 16/32 drop equivalent (i.e., one-half drop equivalent) or more. In some instances, to calculate the drop delay of the flow cytometer, a drop equivalent that ranges from 0.01 drop to 5 drops is added to the drop delay with applied offset phase mask, such as a drop equivalent that ranges from 0.05 drops to 4.5 drops, such as from 0.1 drops to 4 drops, such as from 0.5 drops to 3.5 drops and including from 1 drop to 3 drops.

As summarized above, the subject methods may also include adjusting one or more parameters of the flow cytometer using the determined drop delay without any human intervention. In some embodiments, the timing of applying an electrical charge to a flow stream may be adjusted in response to the determined drop delay. For example, in some instances the application of an electrical charge to a flow stream may be delayed by 0.001 milliseconds or more, such as by 0.005 milliseconds or more, such as by 0.01 milliseconds or more, such as by 0.05 milliseconds or more, such as by 0.1 milliseconds or more, such as by 0.5 milliseconds or more, such as by 1 millisecond or more, such as by 5 milliseconds or more, such as by 10 milliseconds or more, such as by 100 milliseconds or more and including delaying the application of an electrical charge to the flow stream by 500 milliseconds or more.

In other embodiments, the pulse duration while applying an electrical charge to the flow stream may be adjusted in response to the determined drop delay. In one example, the pulse duration is increased, such as by 0.001 milliseconds or more, such as by 0.005 milliseconds or more, such as by 0.01 milliseconds or more, such as by 0.05 milliseconds or more, such as by 0.1 milliseconds or more, such as by 0.5 milliseconds or more, such as by 1 millisecond or more, such as by 5 milliseconds or more, such as by 10 milliseconds or more, such as by 100 milliseconds or more and including by 500 milliseconds or more. In another example, the pulse duration is decreased, such as by 0.001 milliseconds or more, such as by 0.005 milliseconds or more, such as by 0.01 milliseconds or more, such as by 0.05 milliseconds or more, such as by 0.1 milliseconds or more, such as by 0.5 milliseconds or more, such as by 1 millisecond or more, such as by 5 milliseconds or more, such as by 10 milliseconds or more, such as by 100 milliseconds or more and including by 500 milliseconds or more.

In still other embodiments, the flow rate of the flow stream may be adjusted using the determined drop delay. In some instances, the flow rate of the flow stream may be increased in response to the determined drop delay, such as by increasing the flow rate of the flow stream by 0.1 µL/min or more, such as by 0.5 µL/min or more, such as by 1 µL/min or more, such as by 5 µL/min or more, such as by 10 µL/min or more, such as by 25 µL/min or more, such as by 50 µL/min or more, such as by 100 µL/min or more, such as by 250 µL/min or more and including by 500 µL/min or more. For example, the flow rate of the flow stream may be increased by 1% or more in response to the determined drop delay, such as by 5% or more, such as by 10% or more, such as by 15% or more, such as by 25% or more, such as by 50% or more, such as by 75% or more and including increasing the flow rate of the flow stream by 90% or more. In other instances, the flow rate of the flow stream may be decreased in response to the determined drop delay, such as by decreasing the flow rate by 0.1 µL/min or more, such as by 0.5 µL/min or more, such as by 1 µL/min or more, such as by 5 µL/min or more, such as by 10 µL/min or more, such as by 25 µL/min or more, such as by 50 µL/min or more, such as by 100 µL/min or more, such as by 250 µL/min or more and including by 500 λL/min or more. For example, the flow rate of the flow stream may be decreased by 1% or more in response to the determined drop delay, such as by 5% or more, such as by 10% or more, such as by 15% or more, such as by 25% or more, such as by 50% or more, such as by 75% or more and including increasing the flow rate of the flow stream by 90% or more.

In yet other embodiments, the droplet charging voltage may be adjusted in response to the determined drop delay. For example, in some instances, the droplet charging voltage is increased such as by 0.01 V or more, such as 0.05 V or more, such as 0.1 V or more, such as by 0.5V or more, such as by 1V or more, such as by 5V or more, such as by 10V or more, such as by 15V or more, such as by 25V or more, such as by 50V or more and including increasing the drop charging voltage by 75V or more. For example, the droplet charging voltage may be increased by 1% or more, such as by 5% or more, such as by 10% or more, such as by 15% or more, such as by 25% or more, such as by 50% or more, such as by 75% or more and including increasing the droplet charging voltage by 90% or more. In other instances, the droplet charging voltage is reduced, such as by 0.01 V or more, such as 0.05 V or more, such as 0.1 V or more, such as by 0.5V or more, such as by 1V or more, such as by 5V or more, such as by 10V or more, such as by 15V or more, such as by 25V or more, such as by 50V or more and including reducing the droplet charging voltage by 75V or more. For example, the droplet charging voltage may be reduced by 1% or more, such as by 5% or more, such as by 10% or more, such as by 15% or more, such as by 25% or more, such as by 50% or more, such as by 75% or more and including reducing the droplet charging voltage by 90% or more.

FIG. 1 depicts a flow diagram for determining a drop delay of a flow stream in a flow cytometer according to certain embodiments. At step 1, one or more images of a flow stream are captured. As described above, images of the flow stream may be captured in a detection field, such as in a detection field that includes the break off point of the flow stream. At step 2, a disturbance at the break off point of the flow stream is identified. For example, the disturbance may be a deflection of the flow stream or fanning of the flow stream. A drop delay is calculated based on the identified disturbance. At step 3A, the drop delay of the flow cytometer that produces the maximal amplitude of the disturbance at the break off point is determined. At step 3B, an offset phase mask is applied and the drop delay of the flow cytometer that produces the maximal amplitude of the disturbance at the break off point is determined. At step 4A, a predetermined drop equivalent is added to the drop delay determined at step 3A. At step 4B, a predetermined drop equivalent is added to the drop delay determined at step 3B. At step 5, one or more parameters of the flow cytometer may be adjusted in response to the determined drop delay.

Systems for Determining a Drop Delay of a Flow Stream in a Flow Cytometer

Aspects of the present disclosure also include systems for determining drop delay of a flow stream in a flow cytometer. Systems according to certain embodiments include an imaging sensor configured to capture one or more images of a flow stream and a processor having memory operably coupled to the processor where the memory includes instructions to identify a disturbance at a break off point in the imaged flow stream and to calculate a drop delay of the flow stream based on the identified disturbance. As discussed above, systems of interest may be fully automated, such as to reduce or entirely eliminate the need for user input or manual determination of drop delay of the flow cytometer. In embodiments, systems are configured to determine drop delay of the flow stream in the flow cytometer without the use of fluorescent particles (e.g., beads). For example, the systems may be configured to determine drop delay automatically during setup of the flow cytometer or in between analysis of different samples. In other words, determining the drop delay in certain embodiments may require little to no human intervention, manual input or initiation by the user.

As summarized above, systems include one or more imaging sensors configured to capture images of a flow cytometer flow stream, such as in one or more detection fields. As described above, the term "detection field" refers to the region of the flow stream which is imaged by the one or more imaging sensors. Detection fields may vary depending on the properties of the flow stream being interrogated. In embodiments, the detection field may span 0.001 mm or more of the flow stream, such as 0.005 mm or more, such as 0.01 mm or more, such as 0.05 mm or more, such as 0.1 mm or more, such as 0.5 mm or more, such as 1 mm or more, such as 2 mm or more, such as 5 mm or more and including 10 mm or more of the flow stream. In embodiments, the detection field is a predetermined length of the flow stream. In some embodiments, the detection field includes the flow stream upstream from the flow stream break-off point and downstream from a sample interrogation point (e.g., laser interrogation point). In some examples, the boundaries of the detection field include the flow cell nozzle orifice.

Systems include one or more imaging sensors configured to capture images of a flow stream in a detection field. The imaging sensor may be any suitable device capable of capturing and converting an optical image into an electronic data signal, including but not limited to charge-coupled devices, semiconductor charge-coupled devices (CCD), active pixel sensors (APS), complementary metal-oxide semiconductor (CMOS) image sensors or N-type metal-oxide semiconductor (NMOS) image sensors. In some embodiments, the imaging sensor is a CCD camera. For example, the camera may be an electron multiplying CCD (EMCCD) camera or an intensified CCD (ICCD) camera. In other embodiments, the imaging sensor is a CMOS-type camera. Depending on the length of the detection field being interrogated and size of the flow cytometer, the number of imaging sensors in the subject systems may vary, as desired. For example, the subject systems may include one imaging sensor or more, such as two imaging sensors or more, such as three imaging sensors or more, such as four imaging sensors or more, such as five imaging sensors or more and including ten imaging sensors or more. In certain embodiments, systems include one imaging sensor.

In other embodiments, systems include two imaging sensors. Where systems include more than one imaging sensor, each imaging sensors may be oriented with respect to the other (as referenced in an X-Y plane) at an angle ranging from 10° to 90°, such as from 15° to 85°, such as from 20° to 80°, such as from 25° to 75° and including from 30° to 60°. In certain embodiments, each imaging sensor is oriented orthogonally (as referenced in an X-Y plane) to each other. For example, where the subject systems include two imaging sensors, the first imaging sensor is oriented orthogonally (as referenced in an X-Y plane) to the second imaging sensor.

Where the subject systems include more than one imaging sensor, each imaging sensor may be the same or a combination of sensors. For example, where the subject systems include two imaging sensors, in some embodiments the first imaging sensor is a CCD-type device and the second imaging sensor is a CMOS-type device. In other embodiments, both the first and second imaging sensor are CCD-type devices. In yet other embodiments, both the first and second imaging sensors are CMOS-type devices.

In some embodiments, the imaging sensors are stationary, maintaining a single position within the flow cytometer. In other embodiments, the imaging sensors may be configured to move along the path of the flow stream. For instance, the imaging sensor may be configured to move upstream and downstream alongside the flow stream capturing images in a plurality of detection fields. For example, systems may include an imaging sensor which is adapted to capture images in two or more different detection fields along the flow stream, such as a first detection field which includes the flow stream upstream from the flow stream break-off point and downstream from a sample interrogation point and a second detection field which includes the flow stream downstream from a deflection plate, where the flow stream is subjected to an electrical charge upstream from the deflection plate. Where the imaging sensor is configured to move along the flow stream, the imaging sensor may be moved along the flow stream path continuously or in discrete intervals. In some embodiments, the imaging sensor is displaced continuously. In other embodiments, the imaging sensor may be displaced along the flow stream path in discrete intervals, such as for example in 1 mm or greater increments, such as 2 mm or greater increments and including 5 mm or greater increments.

The imaging sensor may be configured to capture images continuously or in discrete intervals during application of each of the plurality of frequencies (as described above) by the oscillating transducer. In some instances, imaging sensors of interest are configured to capture images continuously. In other instances, imaging sensors are configured to take measurements in discrete intervals, such as capturing an image of the flow stream every 0.001 millsecond, every 0.01 millsecond, every 0.1 millsecond, every 1 millsecond, every 10 millseconds, every 100 millseconds and including every 1000 millseconds, or some other interval.

As described in greater detail below, the imaging sensor is configured to capture one or more images of the flow stream. For example, the imaging sensor may be configured to capture 2 or more images of the flow stream in the detection field, such as 3 or more images, such as 4 or more images, such as 5 or more images, such as 10 or more images, such as 15 or more images and including 25 or more images. Where a plurality of images are captured in the detection field, the processor may include digital imaging processing algorithm for combining, when desired, the plurality of images.

Depending on the flow stream rate and desired image resolution, the imaging sensor may have an exposure time of 100 ms or less when reading out the full sensor, such as 75 ms or less, such as 50 ms or less, such as 25 ms or less, such 10 ms or less, such as 5 ms or less, such as 1 ms or less, such as 0.1 ms or less such as 0.01 ms or less, such as 0.001 ms or less, such as 0.0001 ms or less, such as 0.00001 ms or less and including an exposure time of 0.000001 ms or less. For example, the exposure time of the imaging sensor in the detection field which captures images of the flow stream in the detection field that includes the flow stream upstream from the flow stream break-off point and downstream from a sample interrogation point may have an exposure time which ranges from 0.0001 ms to 10 ms, such as from 0.001 ms to 5 ms, such as from 0.01 ms to 2 ms and including from 0.1 ms to 1 ms.

In certain embodiments, imaging sensors in the subject systems may have 1 M active pixels or more, such as 1.5 M or more, e.g., 2 M or more, 2.5 M or more, or 3 M or more. In certain aspects, a pixel corresponds to an actual physical dimension of about 0.3 µm. Depending on the detection field, in some instances, imaging sensors have a sensor area of 150 mm² or more, such as about 150 mm² to about 175 mm², about 175 mm² to about 200 mm², 200 mm² to about 225 mm², about 225 mm² to about 250 mm², about 250 mm² to about 300 mm², about 300 mm² to about 400 mm², about 400 mm² to about 500 mm², about 500 mm² to about 750 mm², about 750 mm² to about 1000 mm², or about 1000 mm² or more.

The imaging sensor may be positioned at any suitable distance from the flow cytometer flow stream so long as the sensor is capable of capturing an image of the flow stream in the detection field. For example, the imaging sensor may be positioned 0.01 mm or more from the flow stream, such as 0.05 mm or more, such as 0.1 mm or more, such as 0.5 mm or more, such as 1 mm or more, such as 2.5 mm or more, such as 5 mm or more, such as 10 mm or more, such as 15 mm or more, such as 25 mm or more and including 50 mm or more from the flow cytometer flow stream.

In some embodiments, the imaging sensor is positioned at an angle with respect to the flow stream axis. For example, the imaging sensor may be positioned at an angle with respect to the axis of the flow stream which ranges from 10° to 90°, such as from 15° to 85°, such as from 20° to 80°, such as from 25° to 75° and including from 30° to 60°. In certain embodiments, the imaging sensor is positioned at a 90° angle with respect to the axis of the flow stream.

In some instances, the imaging sensor also includes an optical adjustment protocol. By "optical adjustment" is meant that capturing images of the detection field by the imaging sensor may be changed as desired, such as to increase or decrease the captured dimensions or to enhance the optical resolution of the image. In some instances, optical adjustment is a magnification protocol configured to increase the size of the detection field captured by the imaging sensor, such as by 5% or greater, such as by 10% or greater, such as by 25% or greater, such as by 50% or greater and including increasing the detection field of the imaging sensor by 75% or greater. In other instances, optical adjustment is a de-magnification protocol configured to decrease the size of the detection field captured by the imaging sensor, such as by 5% or greater, such as by 10% or greater, such as by 25% or greater, such as by 50% or greater and including decreasing the size of the detection field captured by the imaging sensor by 75% or greater. In certain embodiments, optical adjustment is an enhanced resolution protocol configured to improve the resolution of the captured images, such as by 5% or greater, such as by 10% or greater, such as by 25% or greater, such as by 50% or greater and including enhancing the resolution of the captured images by 75% or greater. Capturing images of the detection field by the imaging sensor may be adjusted with any convenient optical adjustment protocol, including but not limited to lens, mirrors, filters and combinations thereof. In certain embodiments, the imaging sensor includes a focusing lens. The focusing lens, for example may be a de-magnifying lens. In other embodiments, the focusing lens is a magnifying lens.

Imaging sensors of the present disclosure may also include one or more wavelength separators. The term "wavelength separator" is used herein in its conventional sense to refer to an optical protocol for separating polychromatic light into its component wavelengths for detection. Wavelength separation, according to certain embodiments, may include selectively passing or blocking specific wavelengths or wavelength ranges of the polychromatic light. To separate wavelengths of light, the transmitted light may be passed through any convenient wavelength separating protocol, including but not limited to colored glass, bandpass filters, interference filters, dichroic mirrors, diffraction gratings, monochromators and combinations thereof, among other wavelength separating protocols. Systems may include one or more wavelength separators, such as two or more, such as three or more, such as four or more, such as five or more and including 10 or more wavelength separators. In one example, imaging sensors include one bandpass filter. In another example, imaging sensors include two or more bandpass filters. In another example, imaging sensors include two or more bandpass filters and a diffraction grating. In yet another example, imaging sensors include a plurality of bandpass filters and a monochromator. In certain embodiments, imaging sensors include a plurality of bandpass filters and diffraction gratings configured into a filter wheel setup. Where imaging sensors include two or more wavelength separators, the wavelength separators may be utilized individually or in series to separate polychromatic light into component wavelengths. In some embodiments, wavelength separators are arranged in series. In other embodiments, wavelength separators are arranged individually such that one or more measurements are conducted using each of the wavelength separators.

In some embodiments, systems include one or more optical filters, such as one or more bandpass filters. For example, in some instances the optical filters of interest are bandpass filters having minimum bandwidths ranging from 2 nm to 100 nm, such as from 3 nm to 95 nm, such as from 5 nm to 95 nm, such as from 10 nm to 90 nm, such as from 12 nm to 85 nm, such as from 15 nm to 80 nm and including bandpass filters having minimum bandwidths ranging from 20 nm to 50 nm. In other instances, the optical filters are longpass filters, such as for example longpass filters which attenuate wavelengths of light of 1600 nm or less, such as 1550 nm or less, such as 1500 nm or less, such as 1450 nm or less, such as 1400 nm or less, such as 1350 nm or less, such as 1300 nm or less, such as 1000 nm or less, such as 950 nm or less, such as 900 nm or less, such as 850 nm or less, such as 800 nm or less, such as 750 nm or less, such as 700 nm or less, such as 650 nm or less, such as 600 nm or less, such as 550 nm or less, such as 500 nm or less and including a longpass filter which attenuates wavelengths of light of 450 nm or less. In yet other instances, the optical filters are shortpass filters, such as for example shortpass filters which attenuate wavelengths of light of 200 nm or greater, such as 250 nm or greater, such as 300 nm or greater, such as 350 nm or greater, such as 400 nm or greater, such as 450 nm or greater, such as 500 nm or greater, such as 550 nm or greater and including shortpass filters which attenuate wavelengths of light of 600 nm or greater.

In other embodiments, the wavelength separator is a diffraction grating. Diffraction gratings may include, but are not limited to transmission, dispersive or reflective diffraction gratings. Suitable spacings of the diffraction grating may vary depending on the configuration of the light source, detection field and imaging sensor and other optical adjust protocols present (e.g., focusing lens), ranging from 0.01 μm to 10 μm, such as from 0.025 μm to 7.5 μm, such as from 0.5 μm to 5 μm, such as from 0.75 μm to 4 μm, such as from 1 μm to 3.5 μm and including from 1.5 μm to 3.5 μm.

In some embodiments, each imaging sensor is operably coupled to one or more light sources for illuminating the flow stream in the detection field. In some embodiments, the light source is a broadband light source, emitting light having a broad range of wavelengths, such as for example, spanning 50 nm or more, such as 100 nm or more, such as 150 nm or more, such as 200 nm or more, such as 250 nm or more, such as 300 nm or more, such as 350 nm or more, such as 400 nm or more and including spanning 500 nm or more. For example, one suitable broadband light source emits light having wavelengths from 200 nm to 1500 nm. Another example of a suitable broadband light source includes a light source that emits light having wavelengths from 400 nm to 1000 nm. Any convenient broadband light source protocol may be employed, such as a halogen lamp, deuterium arc lamp, xenon arc lamp, stabilized fiber-coupled broadband light source, a broadband LED with continuous spectrum, superluminescent emitting diode, semiconductor light emitting diode, wide spectrum LED white light source, an multi-LED integrated white light source, among other broadband light sources or any combination thereof. In certain embodiments, light sources for illuminating the flow stream in the detection field during image capture include an array of infra-red LEDs.

In other embodiments, the light source is a narrow band light source emitting a particular wavelength or a narrow range of wavelengths. In some instances, the narrow band light sources emit light having a narrow range of wavelengths, such as for example, 50 nm or less, such as 40 nm or less, such as 30 nm or less, such as 25 nm or less, such as 20 nm or less, such as 15 nm or less, such as 10 nm or less, such as 5 nm or less, such as 2 nm or less and including light sources which emit a specific wavelength of light (i.e., monochromatic light). Any convenient narrow band light source protocol may be employed, such as a narrow wavelength LED, laser diode or a broadband light source coupled to one or more optical bandpass filters, diffraction gratings, monochromators or any combination thereof.

As summarized above, systems include one or more processors operably coupled to the imaging sensors where the processors are configured to generate data signals from the captured images and to determine the drop delay of the flow stream. In embodiments, the processors include memory having a plurality of instructions for performing the steps of the subject methods (as described above), such as identifying a disturbance at a break off point in the imaged flow stream and calculating a drop delay of the flow stream based on the identified disturbance. In certain embodiments, the subject processors include memory having a plurality of instructions for determining the drop delay of the flow cytometer that produces a maximal amplitude of the disturbance at the break off point of the flow stream and adding a predetermined drop equivalent to the drop delay that produces the maximal amplitude of the disturbance. In other embodiments, the subject processors include memory having a plurality of instructions for determining the drop delay of the flow cytometer that produces the maximal amplitude of the disturbance at the break off point of the flow stream while applying an offset phase mask and adding a predetermined drop equivalent to the drop delay that produces the maximal amplitude of the disturbance at the break off point of the flow stream.

The subject systems may include both hardware and software components, where the hardware components may take the form of one or more platforms, e.g., in the form of servers, such that the functional elements, i.e., those elements of the system that carry out specific tasks (such as managing input and output of information, processing information, etc.) of the system may be carried out by the execution of software applications on and across the one or more computer platforms represented of the system. The processor includes memory having instructions stored thereon for performing the steps of the subject methods according to different embodiments described herein such as illuminating a flow cytometer flow stream with a light source, capturing one or more images of the flow stream, identifying a disturbance at a break off point in the imaged flow stream and calculating a drop delay of the flow stream based on the identified disturbance.

In embodiments, the processor is configured to obtain one or more images of the flow stream and to identify a disturbance at the break off point of the flow stream. As described above, a "disturbance" in the flow stream at the break off point may be any undesired change in one or more characteristics of the flow stream. For example, the disturbance of the flow stream at the break off point may result from the presence of target particles in the flow stream droplets. In some embodiments, the disturbance is a change in the flow rate of the flow stream at the break off point. In other embodiments, the disturbance is an undesired deflection (i.e., deviation in the angle of the trajectory) of the flow stream. In certain embodiments, the disturbance is a fanning of the flow stream at the break off point.

In some embodiments, the processor is configured to identify the disturbance in the flow stream by visualizing that the flow stream is fanning at the break off point in the imaged flow stream. For example, the processor may include memory with instructions to determine that droplets of the flow stream at the break off point are deflecting at two or more undesired angles with respect to the longitudinal axis of the flow stream, such as 3 or more undesired angles, such as 4 or more undesired angles, such as 5 or more undesired angles and including 10 or more undesired angles. In these embodiments, the processor is configured to determine that the trajectory of the plurality of droplets deviates by 5° or more, such as 10° or more, such as 15° or more, such as 20° or more, such as 25° or more, such as 30° or more, such as 35° or more, such as 40° or more, such as 45° or more, such as 60° or more, such as 75° or more and including 85° or more. For instance, the processor may be configured to determine that the trajectory of the plurality of droplets deviates by 5° to 90°, such as from 10° to 85°, such as from 15° to 80°, such as from 20° to 75°, such as from 25° to 70°, such as from 30° to 65°, such as from 35° to 60° and including from 40° to 55°.

In other embodiments, the processor is configured to identify the disturbance in the flow stream by visualizing that the flow stream is being deflected at an undesired angle at the break off point in the imaged flow stream. In some instances, the flow stream is deflected by 5° or more, such as 10° or more, such as 15° or more, such as 20° or more, such as 25° or more, such as 30° or more, such as 35° or more, such as 40° or more, such as 45° or more, such as 60° or more, such as 75° or more and including 85° or more. For instance, the processor may be configured to identify a disturbance in the flow stream by visualizing that the flow stream is being deflected at the break off point at an angle that ranges from 5° to 90°, such as from 10° to 85°, such as from 15° to 80°, such as from 20° to 75°, such as from 25° to 70°, such as from 30° to 65°, such as from 35° to 60° and including from 40° to 55°.

Systems of interest are also configured to calculate a drop delay of the flow stream based on the identified disturbance. In some embodiments, the processor includes memory having instructions to calculate a drop delay by determining the drop delay of the flow cytometer that produces the maximal amplitude of the disturbance at the break off point and adding a predetermined drop equivalent to the drop delay that produces the maximal amplitude of disturbance. In some instances, the processor is configured to vary the drop delay of the flow cytometer across a plurality of different drop delays and capture one or more images at each of the different drop delays. For example, the processor may be configured to capture one or more images of the disturbance at the break off point while varying the drop delay of the flow cytometer by increments of $1/32$ drop equivalents or more, such as $1/16$ drop equivalents or more, such as $1/8$ drop equivalents or more, such as $1/4$ drop equivalents or more, such as $1/2$ drop equivalents or more, such as 1 drop equivalent or more, such as 2 drop equivalents or more, such as 3 drop equivalents or more, such as 4 drop equivalents or more and including 5 drop equivalents or more.

In certain embodiments, the processor includes memory having instructions for changing the drop delay continuously and monitoring the disturbance at the break off point of the flow stream in real time. In these embodiments, while monitoring the disturbance at the break off point of the flow stream, the processor is configured to vary the drop delay of the flow cytometer by $1/128$ drop equivalents or more per minute, such by $1/64$ drop equivalents or more per minute, such as by $1/32$ drop equivalents or more per minute, such as by $1/16$ drop equivalents or more per minute, such as by $1/8$ drop equivalents or more per minute, such as by $1/4$ drop equivalents or more per minute, such as by $1/2$ drop equivalents or more per minute, such as by 1 drop equivalent or more per minute, such as by 2 drop equivalents or more per minute, such as by 3 drop equivalents or more per minute, such as by 5 drop equivalents or more per minute and including by 10 drop equivalents or more per minute. To calculate the drop delay of the flow cytometer, the processor includes memory having instructions to add a predetermined drop equivalent to the drop delay that produces the maximal amplitude of disturbance at the break off point of the flow stream. For example, the processor may be configured to add a $1/128$ drop equivalent or more to the drop delay that produces the maximal amplitude of disturbance at the break off point of the flow stream, such as a $1/64$ drop equivalent or more, such as a $1/32$ drop equivalent or more, such as a $2/32$ drop equivalent or more, such as a $3/32$ drop equivalent or more, such as a $4/32$ drop equivalent or more, such as a $5/32$ drop equivalent or more, such as a $6/32$ drop equivalent or more, such as a $7/32$ drop equivalent or more, such as a $8/32$ drop equivalent or more, such as a $10/32$ drop equivalent or more, such as a $12/32$ drop equivalent or more, such as a $14/32$ drop equivalent or more and including a $16/32$ drop equivalent (i.e., one-half drop equivalent) or more. In some instances, the processor includes memory having instructions to add a drop equivalent that ranges from 0.01 drop to 5 drops to the drop delay that produces the maximal amplitude of disturbance at the break off point of the flow stream, such as a drop equivalent that ranges from 0.05 drops to 4.5 drops, such as from 0.1 drops to 4 drops, such as from 0.5 drops to 3.5 drops and including from 1 drop to 3 drops.

In certain embodiments, the processor is configured to apply a phase mask while determining the drop delay of the flow cytometer that produces the maximal amplitude of the disturbance at the break off point of the flow stream. As described above, the phase mask may be any convenient size, such as $1/128$ drop equivalent or more, such as $1/64$ drop equivalent or more, such as $1/32$ drop equivalent or more, such as $2/32$ drop equivalents or more, such as $3/32$ drop equivalents or more, such as $4/32$ drop equivalents or more, such as $5/32$ drop equivalents or more, such as $6/32$ drop equivalents or more, such as $7/32$ drop equivalents or more and including a phase mask of $8/32$ drop equivalents or more.

Systems of interest may also be configured to calculate a drop delay by determining the drop delay of the flow cytometer that produces the maximal amplitude of the disturbance at the break off point of the flow stream while applying an offset phase mask and adding a predetermined drop equivalent to the drop delay that produces the maximal amplitude of the disturbance at the break off point of the flow stream. In these embodiments, the offset phase mask may be $1/128$ drop equivalent or more, such as $1/64$ drop equivalent or more, such as $1/32$ drop equivalent or more, such as $2/32$ drop equivalents or more, such as $3/32$ drop equivalents or more, such as $4/32$ drop equivalents or more, such as $5/32$ drop equivalents or more, such as $6/32$ drop equivalents or more, such as $7/32$ drop equivalents or more, such as $8/32$ drop equivalents or more, such as $10/32$ drop equivalents or more, such as $12/32$ drop equivalents or more, such as $14/32$ drop equivalents or more and including $16/32$ drop equivalents (i.e., one-half drop equivalent) or more. Depending on the size of the offset phase mask, the processor is configured to add a predetermined drop equivalent that varies. For example, the memory may include instructions for adding a $1/128$ drop equivalent or more, such as a $1/64$ drop equivalent or more, such as a $1/32$ drop equivalent or more to the drop delay with applied offset phase mask that produces the maximal amplitude of the disturbance at the break off point of the flow stream, such as a $2/32$ drop equivalent or more, such as a $3/32$ drop equivalent or more, such as a $4/32$ drop equivalent or more, such as a $5/32$ drop equivalent or more, such as a $6/32$ drop equivalent or more, such as a $7/32$ drop equivalent or more, such as a $8/32$ drop equivalent or more, such as a $10/32$ drop equivalent or more, such as a $12/32$ drop equivalent or more, such as a $14/32$ drop equivalent or more and including a $16/32$ drop equivalent (i.e., one-half drop equivalent) or more. In some instances, the memory may include instructions for adding a drop equivalent that ranges from 0.01 drop to 5 drops is added to the drop delay with applied offset phase mask that produces the maximal amplitude of disturbance at the break off point of the flow stream, such as a drop equivalent that ranges from 0.05 drops to 4.5 drops, such as from 0.1 drops to 4 drops, such as from 0.5 drops to 3.5 drops and including from 1 drop to 3 drops.

As summarized above, the subject systems may also be configured to adjust one or more parameters of a flow cytometer using the determined drop delay without any human intervention. In some embodiments, systems of interest are configured to adjust the timing of applying an electrical charge to a flow stream in response to the determined drop delay. For example, the subject systems may be configured to delay the application of an electrical charge to a flow stream by 0.001 milliseconds or more, such as by 0.005 milliseconds or more, such as by 0.01 milliseconds or more, such as by 0.05 milliseconds or more, such as by 0.1 milliseconds or more, such as by 0.5 milliseconds or more, such as by 1 millisecond or more, such as by 5 milliseconds or more, such as by 10 milliseconds or more, such as by 100 milliseconds or more and including delaying the application of an electrical charge to the flow stream by 500 milliseconds or more.

In other embodiments, systems of interest are configured to adjust the pulse duration while applying an electrical charge to the flow stream in response to the determined drop delay. In one example, the subject systems are configured to increase pulse duration by 0.001 milliseconds or more, such as by 0.005 milliseconds or more, such as by 0.01 milliseconds or more, such as by 0.05 milliseconds or more, such as by 0.1 milliseconds or more, such as by 0.5 milliseconds or more, such as by 1 millisecond or more, such as by 5 milliseconds or more, such as by 10 milliseconds or more, such as by 100 milliseconds or more and including by 500 milliseconds or more. In another example, the subject systems are configured to decrease pulse duration by 0.001 milliseconds or more, such as by 0.005 milliseconds or more, such as by 0.01 milliseconds or more, such as by 0.05 milliseconds or more, such as by 0.1 milliseconds or more, such as by 0.5 milliseconds or more, such as by 1 millisecond or more, such as by 5 milliseconds or more, such as by 10 milliseconds or more, such as by 100 milliseconds or more and including by 500 milliseconds or more.

In still other embodiments, systems of interest are configured to adjust the flow rate of the flow stream in response to the determined drop delay. In some instances, the subject systems increase the flow rate of the flow stream, such as by increasing the flow rate of the flow stream by 0.1 µL/min or more, such as by 0.5 µL/min or more, such as by 1 µL/min or more, such as by 5 µL/min or more, such as by 10 µL/min or more, such as by 25 µL/min or more, such as by 50 µL/min or more, such as by 100 µL/min or more, such as by 250 µL/min or more and including by 500 µL/min or more. In other instances, the subject systems decrease the flow rate of the flow stream, such as by decreasing the flow rate of the flow stream by 0.1 µL/min or more, such as by 0.5 µL/min or more, such as by 1 µL/min or more, such as by 5 µL/min or more, such as by 10 µL/min or more, such as by 25 µL/min or more, such as by 50 µL/min or more, such as by 100 µL/min or more, such as by 250 µL/min or more and including by 500 µL/min or more.

In yet other embodiments, systems of interest are configured to adjust the droplet charging voltage in response to the determined drop delay. In some instances, the subject systems are configured to increase the droplet charging voltage, such as by 0.01 V or more, such as 0.05 V or more, such as 0.1 V or more, such as by 0.5V or more, such as by 1V or more, such as by 5V or more, such as by 10V or more, such as by 15V or more, such as by 25V or more, such as by 50V or more and including increasing the drop charging voltage by 75V or more. In other instances, the subject systems are configured reduce the droplet charging voltage, such as by 0.01 V or more, such as 0.05 V or more, such as 0.1 V or more, such as by 0.5V or more, such as by 1V or more, such as by 5V or more, such as by 10V or more, such as by 15V or more, such as by 25V or more, such as by 50V or more and including reducing the drop charging voltage by 75V or more.

In certain embodiments, the subject systems include flow cytometer systems employing flow cell nozzles and optics subsystems for detecting light emitted by a sample in a flow stream. Suitable flow cytometer systems and methods for analyzing samples include, but are not limited to those described in Ormerod (ed.), *Flow Cytometry: A Practical Approach*, Oxford Univ. Press (1997); Jaroszeski et al. (eds.), *Flow Cytometry Protocols*, Methods in Molecular Biology No. 91, Humana Press (1997); *Practical Flow Cytometry*, 3rd ed., Wiley-Liss (1995); Virgo, et al. (2012) *Ann Clin Biochem*. Jan; 49(pt 1): 17-28; Linden, et. al., *Semin Throm Hemost*. 2004 Oct; 30(5): 502-11; Alison, et al. *J Pathol*, 2010 Dec; 222(4): 335-344; and Herbig, et al. (2007) *Crit Rev Ther Drug Carrier Syst*. 24(3): 203-255; the disclosures of which are incorporated herein by reference. In certain instances, flow cytometry systems of interest include BD Biosciences FACSCanto™ flow cytometer, BD Biosciences FACSVantage™, BD Biosciences FACSort™, BD Biosciences FACSCount™, BD Biosciences FACScan™, and BD Biosciences FACSCalibur™ systems, a BD Biosciences Influx™ cell sorter, BD Biosciences Jazz™ cell sorter and BD Biosciences Aria™ cell sorter or the like.

In certain embodiments, the subject systems are flow cytometer systems which incorporate one or more components of the flow cytometers described in U.S. Pat. Nos. 3,960,449; 4,347,935; 4,667,830; 4,704,891; 4,770,992; 5,030,002; 5,040,890; 5,047,321; 5,245,318; 5,317,162; 5,464,581; 5,483,469; 5,602,039; 5,620,842; 5,627,040; 5,643,796; 5,700,692; 6,372,506; 6,809,804; 6,813,017; 6,821,740; 7,129,505; 7,201,875; 7,544,326; 8,140,300; 8,233,146; 8,753,573; 8,975,595; 9,092,034; 9,095,494 and 9,097,640; the disclosures of which are herein incorporated by reference.

In some embodiments, the flow cytometers are flow cytometers that include one or more components from the cytometers described in: U.S. application Ser. No. 14/260,177 published as US2014/0320861; U.S. Provisional Application Ser. No. 62/090,248 and U.S. Provisional Application Ser. No. 62/091,421; the disclosures of which are herein incorporated by reference.

Computer-Readable Storage Medium for Determining Drop Delay of Flow Cytometer Flow Stream Aspects of the present disclosure further include non-transitory computer readable storage mediums having instructions for practicing the subject methods. Computer readable storage mediums may be employed on one or more computers for complete automation or partial automation of a system for practicing methods described herein. In certain embodiments, instructions in accordance with the method described herein can be coded onto a computer-readable medium in the form of "programming", where the term "computer readable medium" as used herein refers to any non-transitory storage medium that participates in providing instructions and data to a computer for execution and processing. Examples of suitable non-transitory storage media include a floppy disk, hard disk, optical disk, magneto-optical disk, CD-ROM, CD-R, magnetic tape, non-volatile memory card, ROM, DVD-ROM, Blue-ray disk, solid state disk, and network attached storage (NAS), whether or not such devices are internal or external to the computer. A file containing information can be "stored" on computer readable medium, where "storing" means recording information such that it is accessible and retrievable at a later date by a computer. The computer-implemented method described herein can be executed using programming that can be written in one or more of any number of computer programming languages. Such languages include, for example, Java (Sun Microsystems, Inc., Santa Clara, Calif.), Visual Basic (Microsoft Corp., Redmond, Wash.), and C++ (AT&T Corp., Bedminster, N.J.), as well as any many others.

In some embodiments, computer readable storage media of interest include a computer program stored thereon, where the computer program when loaded on the computer includes instructions having: algorithm for capturing an image of a flow stream with an image sensor; algorithm for identifying a disturbance at a break off point in the imaged flow stream; and algorithm for calculating a drop delay of the flow stream based on the identified disturbance.

The computer readable storage medium may include instructions for capturing one or more images of the flow stream, such as 2 or more images of the flow stream, such as 3 or more images, such as 4 or more images, such as 5 or more images, such as 10 or more images, such as 15 or more images and including 25 or more images. In certain embodiments, the computer readable storage medium includes instructions for optical adjustment of the captured images, such as to enhance the optical resolution of the image. In certain embodiments, computer readable storage medium may include instructions for enhancing the resolution of the captured images by 5% or greater, such as by 10% or greater, such as by 25% or greater, such as by 50% or greater and including enhancing the resolution of the captured images by 75% or greater.

In embodiments, computer readable storage media of interest include algorithm for identifying a disturbance at the break off point of the flow stream. In some embodiments, the computer readable storage media includes algorithm for sensing a change in the flow rate of the flow stream at the break off point. In other embodiments, the computer readable storage media includes algorithm for identifying an undesired deflection (i.e., deviation in the angle of the trajectory) of the flow stream. In computer readable storage media includes algorithm for identifying fanning of the flow stream at the break off point.

The computer readable storage medium also includes algorithm for calculating a drop delay based on the identified disturbance at the break off point of the flow stream. In some embodiments, computer readable storage media of interest include algorithm for determining the drop delay of the flow cytometer that produces a maximal amplitude of the disturbance at the break off point of the flow stream and adding a predetermined drop equivalent to the drop delay that produces the maximal amplitude of the disturbance. In other embodiments, computer readable storage media of interest include algorithm for determining the drop delay of the flow cytometer that produces the maximal amplitude of the disturbance at the break off point of the flow stream while applying an offset phase mask and adding a predetermined drop equivalent to the drop delay that produces the maximal amplitude of the disturbance at the break off point of the flow stream.

The computer readable storage medium may be employed on one or more computer systems having a display and operator input device. Operator input devices may, for example, be a keyboard, mouse, or the like. The processing module includes a processor which has access to a memory having instructions stored thereon for performing the steps of the subject methods. The processing module may include an operating system, a graphical user interface (GUI) controller, a system memory, memory storage devices, and input-output controllers, cache memory, a data backup unit, and many other devices. The processor may be a commercially available processor or it may be one of other processors that are or will become available. The processor executes the operating system and the operating system interfaces with firmware and hardware in a well-known manner, and facilitates the processor in coordinating and executing the functions of various computer programs that may be written in a variety of programming languages, such as Java, Perl, C++, other high level or low level languages, as well as combinations thereof, as is known in the art. The operating system, typically in cooperation with the processor, coordinates and executes functions of the other components of the computer. The operating system also provides scheduling, input-output control, file and data management, memory management, and communication control and related services, all in accordance with known techniques.

Utility

The subject methods, systems, and computer readable storage medium find use in a variety of different applications where it is desirable to accurately and conveniently determine drop delay of a flow cytometer. The present disclosure also finds use in automating calibration and setup of a flow cytometer so as to provide for fast, reliable systems for characterizing and sorting cells from a biological sample. Embodiments of the present disclosure find use where minimizing the amount of reliance on human input and adjustments to the system are desired, such as in research and high throughput laboratory testing. The present disclosure also finds use where it is desirable to provide a flow cytometer with improved cell sorting accuracy, enhanced particle collection, particle charging efficiency, more accurate particle charging and enhanced particle deflection during cell sorting. In embodiments, the present disclosure reduces the need for user input or manual adjustment to set up the flow cytometer or between sample analysis with the flow cytometer. In certain embodiments, the subject systems provide fully automated protocols so that calculation of the drop delay of the flow cytometer as well as adjustments to parameters of the flow cytometer that rely on an accurate drop delay (e.g., timing of flow stream charging) require little, if any human input.

The present disclosure also finds use in applications where cells prepared from a biological sample may be desired for research, laboratory testing or for use in therapy. In some embodiments, the subject methods and devices may facilitate the obtaining individual cells (i.e., single cell resolution) prepared from a target fluidic or tissue biological sample. For example, the subject methods and systems facilitate obtaining cells from fluidic or tissue samples to be used as a research or diagnostic specimen for diseases such as cancer. Likewise, the subject methods and systems facilitate obtaining cells from fluidic or tissue samples to be used in therapy. Methods, systems and computer readable storage media described herein allow for separating and collecting cells from a biological sample (e.g., organ, tissue, tissue fragment, fluid) with enhanced efficiency and low cost as compared to traditional flow cytometry systems.

Although the foregoing invention has been described in some detail by way of illustration and example for purposes of clarity of understanding, it is readily apparent to those of ordinary skill in the art in light of the teachings of this disclosure that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A system comprising:
an imaging sensor configured to capture images, in one or more detection fields, of a flow stream of a flow cytometer, wherein the flow stream comprises a liquid sample containing particles flowing through a detection region of the flow cytometer, wherein the detection region comprises a flow cell having: an input, into which the liquid sample is introduced, an interrogation point, and a nozzle from which the flow stream of the liquid sample exits the flow cell,
wherein the flow stream exits the nozzle as a continuous flow stream that transitions to a stream of liquid droplets at a break off point, wherein the break off point is a point at which, upstream from the break off point, the flow stream is a continuous and connected fluidic stream and, downstream from the break off point, the flow stream is composed of a plurality of droplets having no physical contact with each other; and
a processor comprising memory operably coupled to the processor, wherein the memory includes instructions stored thereon to:
identify a disturbance comprising a change in the break off point in the imaged flow stream, wherein such disturbance further comprises a change that is fanning of the flow stream or a change that is deflection of the flow stream;
apply an electrical charge to a droplet forming at the break off point of the flow stream; and
calculate a drop delay of the flow stream based on the identified disturbance, wherein the drop delay is the amount of time between the time a particle of the liquid sample is detected by the flow cytometer at the interrogation point and the time an electrical charge is applied to the droplet forming at the break off point of the flow stream.

2. The system according to claim 1, wherein the memory comprises instructions stored thereon to identify a disturbance that comprises a change that is fanning of the flow stream.

3. The system according to claim 1, wherein the memory comprises instructions stored thereon to identify a disturbance that comprises a change that is deflection of the flow stream.

4. The system according to claim 3,
wherein the imaging sensor is further configured to capture images corresponding to each of a plurality of different drop delays of the flow cytometer, wherein the plurality of different drop delays differ by drop equivalent increments, and
wherein the memory comprises instructions stored thereon to:
calculate the drop delay corresponding to a maximal magnitude of the disturbance; and
add a predetermined drop equivalent to the drop delay at the maximal magnitude of the disturbance wherein the drop delay at the maximal magnitude of disturbance plus a predetermined drop equivalent provides for an optimized drop delay.

5. The system according to claim 4, wherein the predetermined drop equivalent is a one-half drop equivalent.

6. The system according to claim 4, wherein the memory comprises instructions stored thereon to calculate the drop delay at the maximal magnitude of the disturbance with an applied phase mask.

7. The system according to claim 6, wherein the phase mask comprises $1/32$ drop equivalent increments.

8. The system according to claim 6, wherein the memory comprises instructions stored thereon to calculate the drop delay at the maximal magnitude of the disturbance with an applied $8/32$ drop equivalent phase mask.

9. The system according to claim 6, wherein the memory comprises instructions stored thereon to:
determine the drop delay corresponding to a maximal magnitude of the disturbance while applying a one-half drop equivalent offset phase mask; and
add a predetermined drop equivalent to the drop delay at the maximal magnitude of the disturbance wherein the drop delay at the maximal amplitude of disturbance plus a predetermined drop equivalent provides for an optimized drop delay.

10. The system according to claim 9, wherein the memory comprises instructions stored thereon to not add drop equivalent to the drop delay at the maximal magnitude of disturbance while the one-half drop equivalent offset phase mask is applied.

11. The system according to claim 1, wherein a detection field of the one or more detection fields comprises the flow stream upstream from the flow stream break-off point and downstream from the interrogation point.

12. The system according to claim 11, further comprising a light source.

13. The system according to claim 12, wherein the light source is a laser.

14. The system according to claim 12, wherein the light source is a light emitting diode.

15. The system according to claim 14, wherein the memory comprises instructions to adjust one or more parameters of the flow cytometer in response to the calculated drop delay.

16. The system according to claim 15, wherein the memory comprises instructions to adjust the application of electrical charge to the flow stream in response to the calculated drop delay.

17. The system according to claim 16, wherein the memory comprises instructions to adjust a timing of applying the electrical charge to the flow stream in response to the calculated drop delay.

18. The system according to claim 16, wherein the memory comprises instructions to adjust a charge pulse duration in response to the calculated drop delay.

19. The system according to claim 18, wherein the memory comprises instructions to reduce the charge pulse duration in response to the calculated drop delay.

20. The system according to claim 18, wherein the memory comprises instructions to increase the charge pulse duration in response to the calculated drop delay.

21. The system according to claim 1, wherein the imaging sensor is further configured to obtain an imaged flow stream by continuously capturing images of the flow stream.

22. The system according to claim 1, wherein the memory comprises instructions to identify a disturbance comprising a change in the break off point in the imaged flow stream by assessing the likeness of one or more images of a feature of a flow stream with one or more images of a disturbance comprising a change in the break off point.

23. The system according to claim 1, wherein a detection field of the one or more detection fields includes the flow stream downstream from the flow stream break off point.

* * * * *